US006464582B1

(12) United States Patent
Baerlocher et al.

(10) Patent No.: US 6,464,582 B1
(45) Date of Patent: Oct. 15, 2002

(54) GAMING DEVICE WITH A BONUS SCHEME HAVING REPEATED SELECTION OF VALUE SETS WITH OPTION TO SAVE VALUES

(75) Inventors: Anthony J. Baerlocher, Reno, NV (US); Bayard S. Webb, Sparks, NV (US)

(73) Assignee: IGT, Reno NV ( * ) Notice: Subject to any disclaimer, the term of this patent is extended or adjusted under 35 U.S.C. 154(b) by 0 days.

(21) Appl. No.: 09/684,533

(22) Filed: Oct. 6, 2000

(51) Int. Cl.[7] ................................................ A63F 13/00
(52) U.S. Cl. ..................................... 463/20; 273/143 R
(58) Field of Search ............................. 273/138.1, 139, 273/143 R, 271, 275, 269, 292; 463/16–20; 434/191

(56) References Cited

U.S. PATENT DOCUMENTS 2,743,108 A * 4/1956 Sanders ...................... 273/135
3,904,207 A * 9/1975 Gold ...................... 273/135 R
4,695,053 A 9/1987 Vazquez, Jr. et al. ... 273/143 R
4,775,155 A 10/1988 Lees .......................... 273/139
5,205,555 A 4/1993 Hamano ................. 273/143 R
5,536,016 A 7/1996 Thompson .................. 273/269
5,639,089 A 6/1997 Matsumoto et al. .... 273/142 E
5,755,619 A 5/1998 Matsumoto et al. .......... 463/19
5,823,873 A * 10/1998 Moody ........................ 463/13
5,893,718 A * 4/1999 O'Donnell .................. 434/128
5,935,002 A 8/1999 Faleiglia ...................... 463/19
5,976,016 A * 11/1999 Moody et al. ................ 463/13
5,997,401 A 12/1999 Crawford ..................... 463/20
6,007,066 A * 12/1999 Moody ....................... 273/292
6,015,346 A 1/2000 Bennett ....................... 463/20
6,019,369 A 2/2000 Nakagawa et al. ......... 273/246
6,056,642 A 5/2000 Bennett ....................... 463/20
6,089,976 A 7/2000 Schneider et al. ............ 463/16
6,093,102 A 7/2000 Bennett ....................... 463/20
6,102,798 A 8/2000 Bennett ....................... 463/16
6,126,542 A 10/2000 Fier ............................ 463/16
6,135,884 A * 10/2000 Hedrick et al. ............... 463/20
6,142,873 A * 11/2000 Weiss .......................... 463/20
6,159,096 A 12/2000 Yoseloff ...................... 463/20
6,159,098 A 12/2000 Slomiany et al. ............ 463/25

FOREIGN PATENT DOCUMENTS

| | | | | |
|---|---|---|---|---|
| EP | 0874337 A1 | 10/1998 | ........... | G07F/17/32 |
| EP | 0945837 A2 | 9/1999 | ........... | G07F/17/32 |
| EP | 0984408 A2 | 3/2000 | ........... | G07F/17/32 |
| EP | 0984409 A2 | 3/2000 | ........... | G07F/17/32 |
| GB | 2 137 392 A | 10/1984 | ........... | G07F/17/37 |
| GB | 2 191 030 A | 12/1987 | ........... | G07F/17/34 |
| WO | WO 00/12186 | 3/2000 | ........... | A63F/13/00 |

OTHER PUBLICATIONS

Top Dollar Brochure published by IGT in 1999.
Fortune Cookie Brochure published by IGT in 2000.
Take Your Pick Brochure published by Anchor Games in 1999.

* cited by examiner

*Primary Examiner*—Valencia Martin-Wallace
*Assistant Examiner*—Scott E. Jones
(74) *Attorney, Agent, or Firm*—Bell, Boyd & Lloyd LLC

(57) ABSTRACT

The present invention involves a gaming device with a bonus scheme which includes a plurality of value sets and associated value set symbols. The gaming device enables the player to select a value set symbol. The player can accept an award associated with the value set symbol or instead, save one or more values in the selected value set and select another value set symbol which includes the saved value(s). This type of bonus scheme adds excitement to bonus rounds and increases player entertainment.

47 Claims, 8 Drawing Sheets

FIG.3C

100

| | | | |
|---|---|---|---|
| 95 | 5 | 45 | 15 |
| 25 | 70 | 50 | 65 |
| 10 | 80 | 85 | 5 |
| 55 | 5 | 30 | 100 |

FIG.3D

100

| | | | |
|---|---|---|---|
| | | | |
| 25 | 70 | 50 | 65 |
| | | | |
| | | | |

FIG.3E

100

| | | | |
|---|---|---|---|
| | 5 | | |
| | 70 | | |
| | 80 | | |
| | 5 | | |

FIG.3F

100

| | | | |
|---|---|---|---|
| | | | |
| | | | |
| 10 | 80 | 85 | 5 |
| | | | |

GAMING DEVICE WITH A BONUS SCHEME HAVING REPEATED SELECTION OF VALUE SETS WITH OPTION TO SAVE VALUES

CROSS-REFERENCE TO RELATED APPLICATIONS

This application is related to the following commonly-owned co-pending patent applications:"GAMING DEVICE HAVING PYRAMID BONUS SCHEME," Ser. No. 09/656,702, "GAMING DEVICE HAVING SEPARATELY CHANGEABLE VALUE AND MODIFIER BONUS SCHEME," Ser. No. 09/626,045, "GAMING DEVICE WITH PRIZE BONUS SCHEME HAVING MULTIPLE AWARD LEVELS," Ser. No. 09/602,140, "GAMING DEVICE HAVING A MULTIPLE SELECTION GROUP BONUS ROUND," Ser. No. 09/605,107, "GAMING DEVICE HAVING A MULTIPLE SELECTION SET BONUS SCHEME," Ser. No. 09/680,592, "GAMING DEVICE HAVING VALUE SELECTION BONUS," Ser. No. 09/684,605, and "GAMING DEVICE HAVING AN ELEMENT AND ELEMENT GROUP SELECTION AND ELIMINATION BONUS SCHEME," Ser. No. 09/689,381.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme which enables a player to make repeated selections of value sets with the option of saving values.

BACKGROUND OF THE INVENTION

Many existing gaming machines, such as traditional slot machines, include bonus rounds. Typically, a bonus round begins when the player reaches a bonus triggering event in the primary game of the gaming device. In slot machines with reels, the triggering event usually occurs when the player reaches a predetermined combination of symbols on the reels. Usually, the bonus scheme provides the player with an opportunity to gain a bonus value before the bonus round terminates.

Many of these bonus schemes involve a player making selections and receiving an award or no award depending upon the player's selections. Certain bonus schemes include an offer and acceptance feature. For instance, the gaming device provides the player with three selections. The selections are each associated with various values. After the player makes the first selection and the gaming device reveals the associated value, the player can accept or reject this value. If the player rejects this value, the player can make another selection. This process continues until there are no more selections or until the gaming device terminates the bonus round. If a player rejects a value, the player cannot go back and recover this value. This type of bonus scheme was included in a game entitled "TOP DOLLAR," manufactured by IGT. These types of offer and acceptance bonus schemes only enable a player to have a limited amount of control over a player's ultimate reward.

Another type of selection bonus will give the player two values that can be added or multiplied together to create an offer. The player may decide to keep one of the values and reject the other. The rejected value will then be replaced with a substitute value. The substitute value is then added or multiplied with the kept value from the first offer to create a second offer. This can occur a pre-determined number of times before the player will receive the displayed offer. This type of bonus scheme was included in a game "TAKE YOUR PICK," manufactured by IGT. This type of bonus does not give the player many options.

To increase player enjoyment and excitement, it is desirable to provide players with new bonus schemes for gaming devices.

SUMMARY OF THE INVENTION

The present invention overcomes the above shortcomings by providing a gaming device having a bonus scheme which includes a plurality of value sets. The value sets are sets or rosters of numbers. Preferably, the numbers vary in magnitude. Each value set is associated with a value set symbol. A value set symbol can be a single image, a plurality of images, or a configuration of value symbols.

In operation, the gaming device displays a plurality of value set symbols to the player. The player chooses one of the value set symbols. The gaming device then reveals the value set associated with the value set symbol. For instance, after the player makes a selection, the gaming device may reveal the values twenty-five, ten, five and one hundred. The gaming device may then enable the player to accept the sum of these values or instead save one of these values and make a selection of another value set which includes the saved value. The term save, as used herein, includes reserving or designating something for future use. This process continues until the bonus scheme terminates. The bonus scheme can terminate when any predetermined event or sequence of events occurs, as determined by the gaming device. Preferably, the bonus scheme terminates after the player has made a predetermined number of selections. It should be appreciated that the bonus scheme of the present invention can be adapted so that the player can save a plurality of values. Furthermore, the bonus scheme of the present invention can be adapted so that a player can accept and receive one or more of the values in a value set instead of having to receive the sum of the values in a value set.

In one preferred embodiment, the value set symbol is a configuration of value symbols. The value symbols are displayed on a grid which includes a plurality of locations. The configurations are preferably in the form of a straight line connecting value symbol to value symbol from one side of the grid to another side of the grid. These configurations include horizontal, vertical and diagonal lines. It should be appreciated, however, that a configuration can include any shape, any form or any arrangement of value symbols, in any orderly or disorderly fashion.

Since the value symbols and configurations are included within a grid, each configuration includes one value symbol (and one value) in common with another configuration which is identical in location and value. As such, when a player selects an initial configuration, the player has the opportunity to select a different configuration which includes a value symbol and value which is identical to one value symbol and value in the rejected configuration. In operation, the gaming device displays the grid of locations and value symbols to the player. The gaming device, preferably at the same time, informs the player of the various configurations which the player can select. The player then selects a configuration and the gaming device reveals the values associated with each of the value symbols in that configuration. The player then has the opportunity to accept the sum of the values in that configuration and receive an award equal to that sum. Alternatively, the player can take note of the highest value or any other value in that configuration and select a different configuration which includes that value. This process continues until the bonus scheme terminates. Preferably, the bonus scheme terminates after the player has made a predetermined number of selections.

In another embodiment, the gaming device displays a plurality of value set symbols to the player. Here, the value set symbol is a single image. The player can select any one of the value set symbols. After the player selects an initial value set symbol, the gaming device displays the values associated with that value set symbol to the player. Then, the gaming device provides the player with the opportunity to accept the sum of these values and receive an award accordingly or the player can save one of these values and make a different selection which will include the saved value. In this embodiment, the gaming device preferably provides predetermined values for the value sets for the various value set symbols at the outset. However, after the player rejects an initial selection and saves a value, the gaming device then changes the values in the remaining value sets so that each value set includes the saved value. This bonus scheme preferably terminates after the player has made a predetermined number of selections.

The bonus scheme of the present invention involves a plurality of value sets and associated value set symbols. The player has the opportunity to select one or more of the value set symbols and accept or reject an award associated with such value set symbols. If a player rejects an award, the player can save a value from the rejected value set and receive that value in the player's next selection. This type of bonus scheme provides players with a sense of control in the ultimate award they will receive. This sense of control adds excitement and entertainment to gaming devices.

It is therefore an object of the present invention to provide a gaming device with a bonus scheme which enables a player to make repeated selections of value sets with the option of saving values.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 3A through 3F are top plan views of various stages of a bonus scheme found in one embodiment of the present invention;

DETAILED DESCRIPTION OF THE INVENTION

Gaming Device and Electronics

Figure 1A:
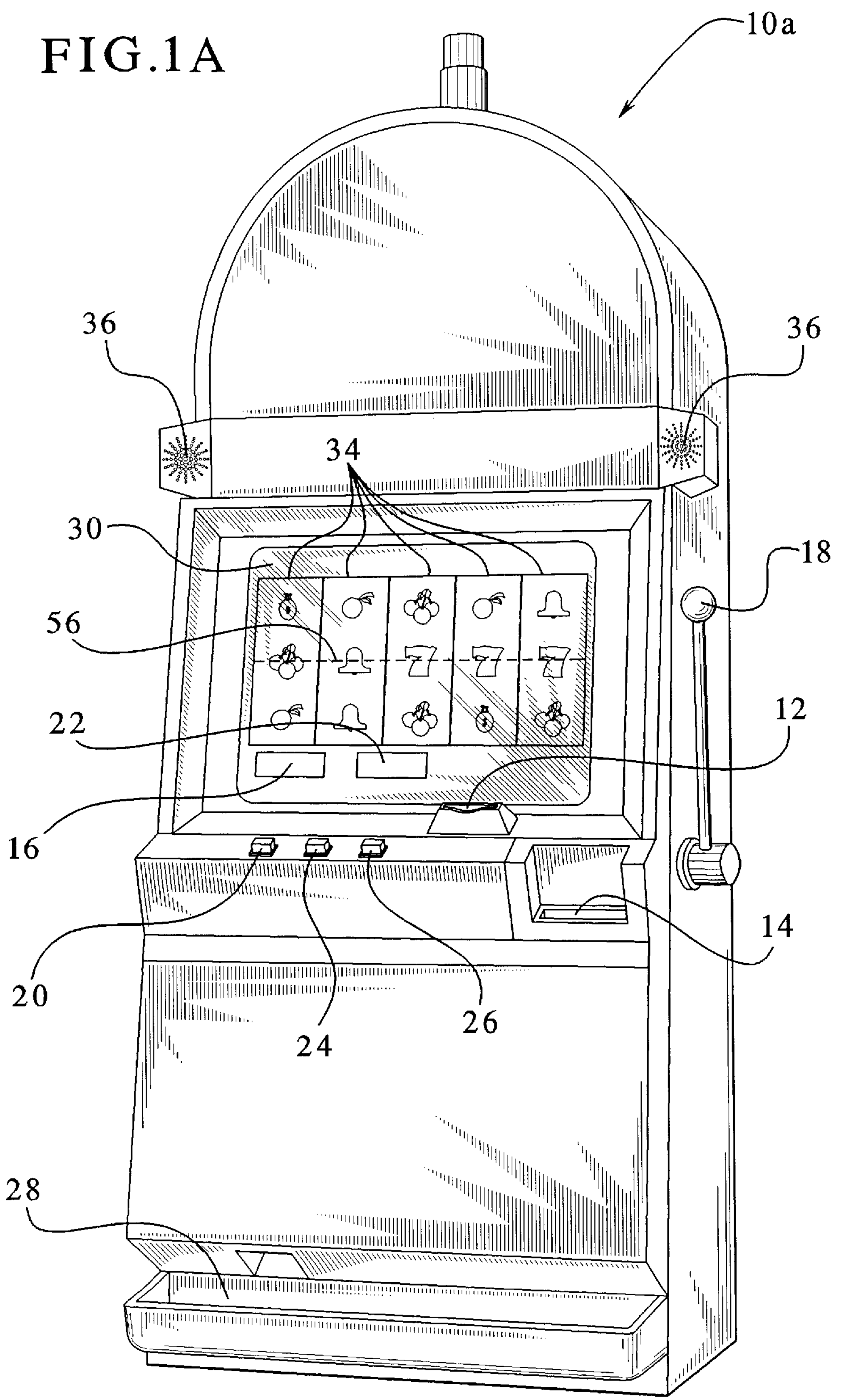
FIG. 1A is a perspective view of one embodiment of the gaming device of the present invention.
Figure 1B:
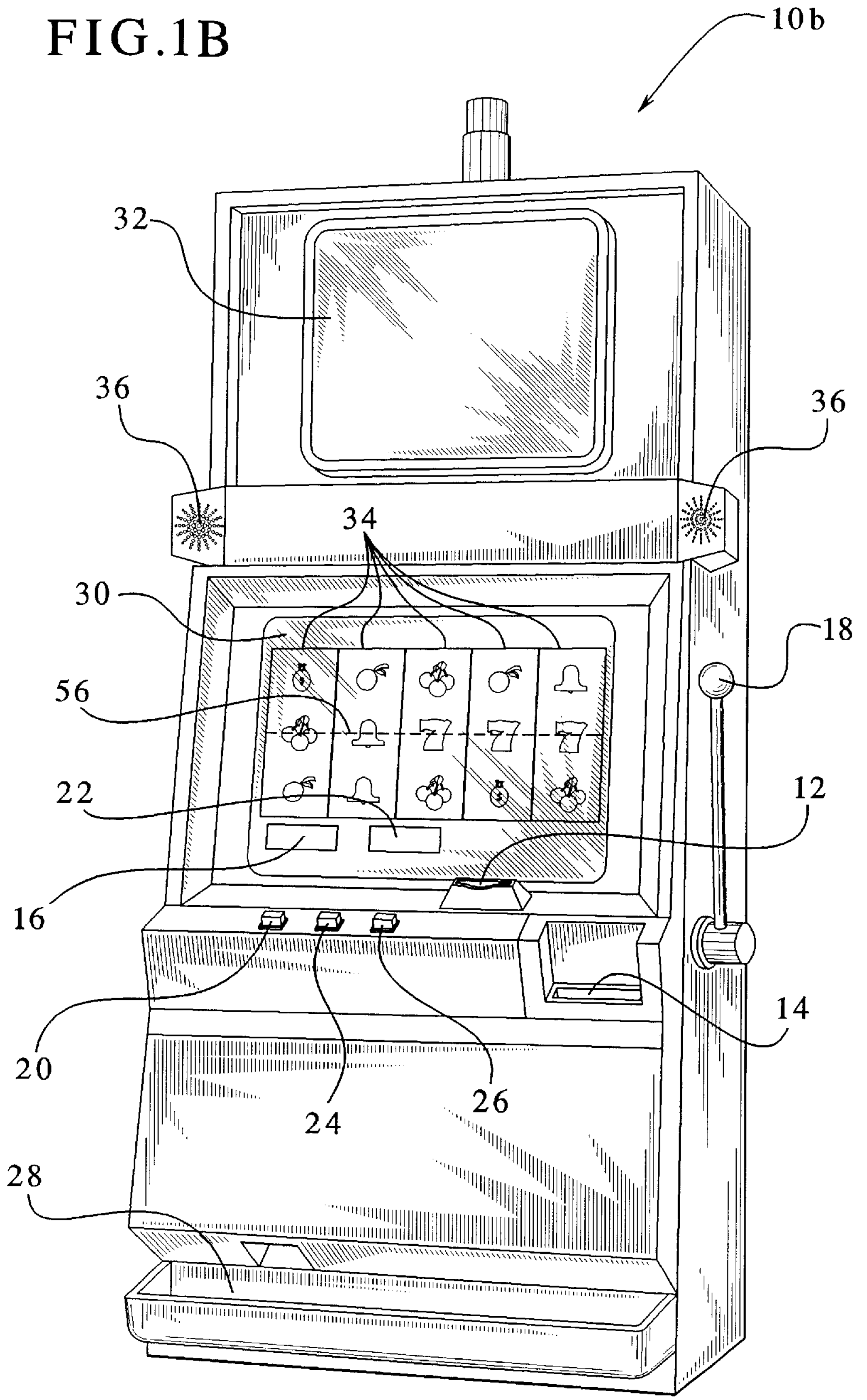
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sifting, and gaming device 10 is preferably mounted on a console. However, it should be appreciated that gaming device 10 can be constructed as a pub-style table-top game (not shown) which a player can operate preferably while sifting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
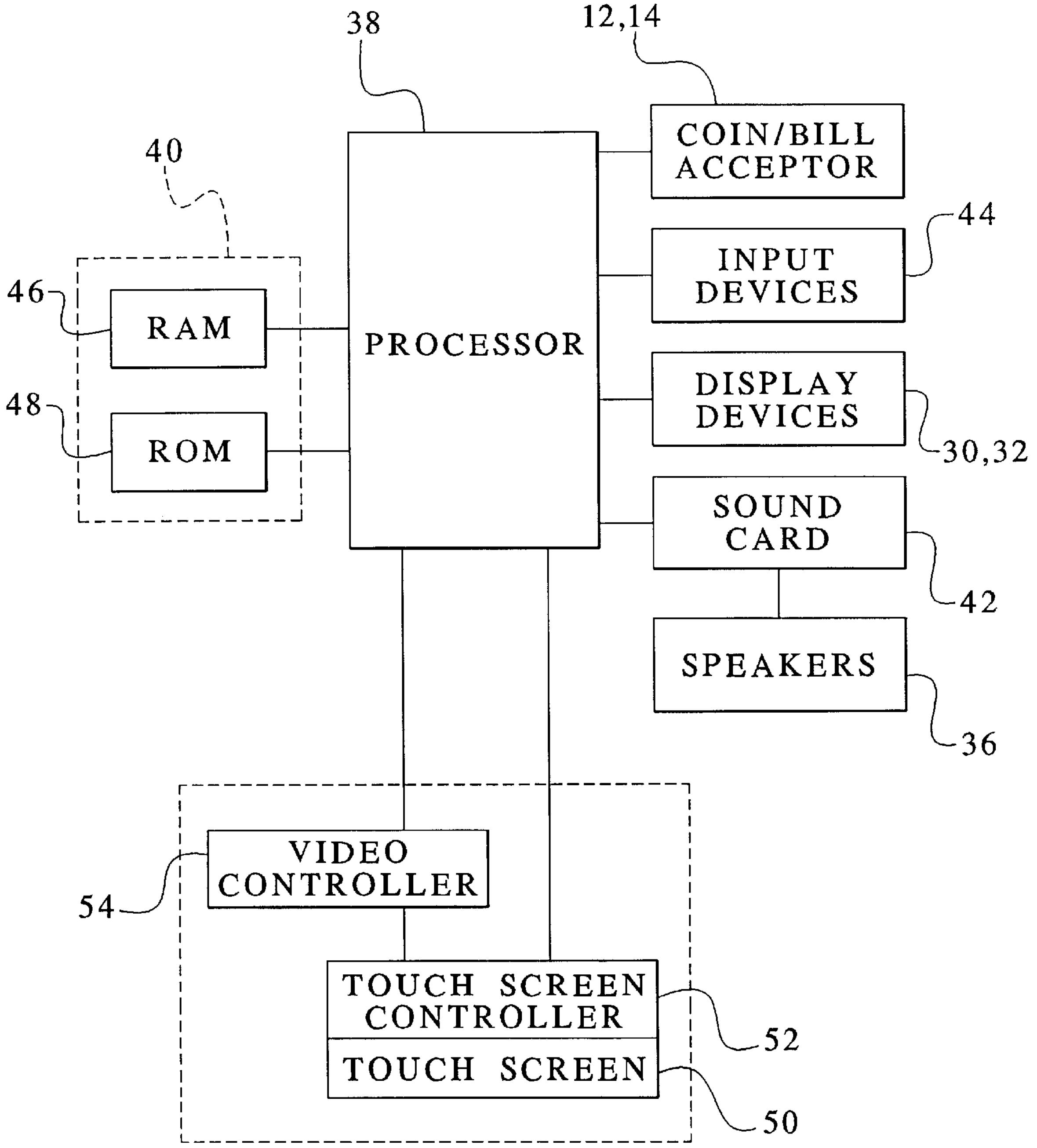
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a"processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Scheme

If a player achieves a bonus triggering or qualifying condition while playing the game, the gaming device automatically initiates the bonus round of the present invention. The bonus scheme of the present invention includes a plurality of value sets. Each value set is associated with a value set symbol. The gaming device enables the player to select one or more of the value set symbols. After making a selection, the gaming device reveals the values associated with the value set symbol. The player then may accept one or more of these values or the sum of these values, and the bonus scheme will then terminate. The player may also reject such values and make another selection. However, the gaming device enables the player to save one or more of the values revealed to the player in the rejected selection. The gaming device will provide the saved value or values to the player in the subsequent selection.

For instance, the player's initial selection may reveal the values two, ten and twenty. The player may accept these values and receive an award equal to the sum of these values which would be thirty-two, or the player may save value twenty and make a different selection. When the player makes the next selection, the values associated with the value set in that selection will include the value twenty and may include any other two values, such as four and thirty. Here, as before, the player can accept the sum of these values, which would be fifty-four, or save any one of these values, and make another selection. If the player decides to save value thirty, the gaming device will include this value in the next value set selected by the player. In this example, in the final selection the gaming device reveals the values thirty, two and four. The gaming device will provide the player with the sum of these values which is thirty-six as an award. Note that had the player chosen to accept the second selection, the player would have obtained the greatest value of fifty-four. However, in this case the player's strategy was to save the highest value associated with each selection and reject the award associated with each selection. In one preferred embodiment of the present invention, the game only enables the player to make the first two selections, whereby the player receives the sum of the values in the second value set selection.

Figure 3A:
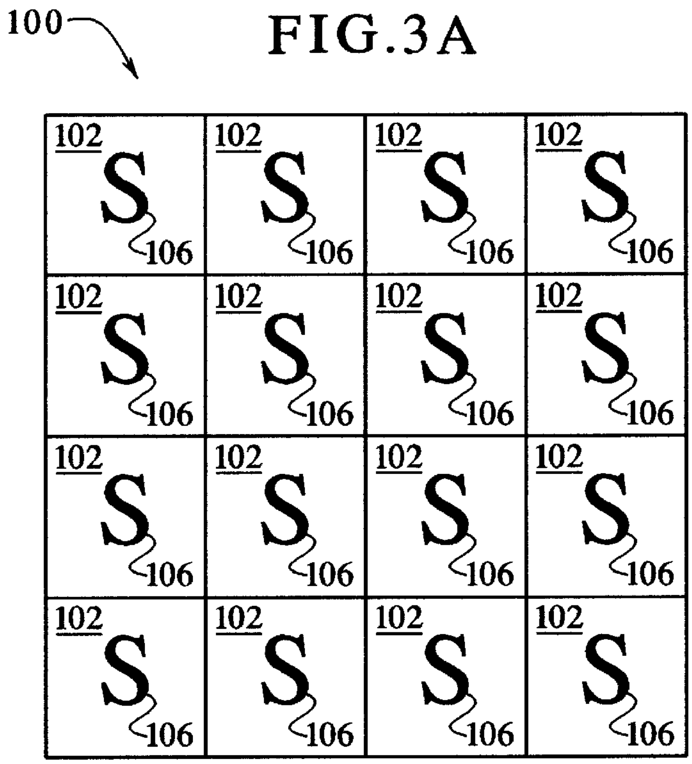
Figure 3B:
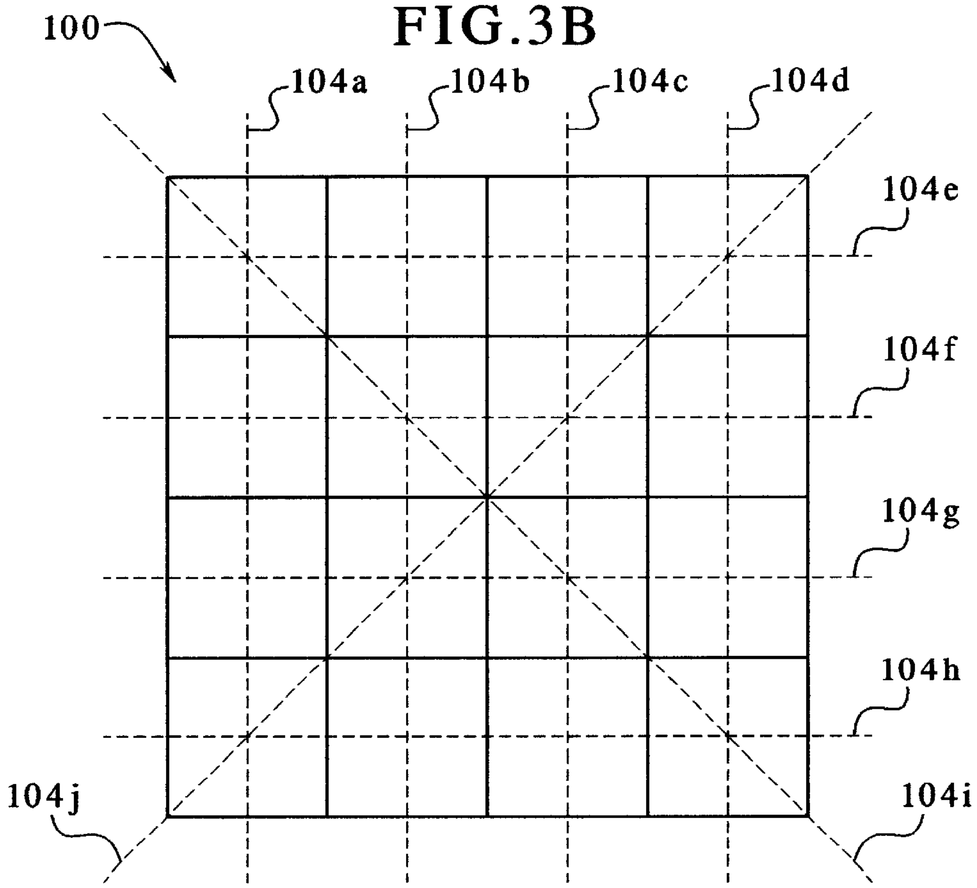

The bonus scheme of the present invention can include any suitable type of bonus set symbol and any suitable process, technique, program or formula which enables a player to make a selection of a value set and to save one or more of the values revealed in that value set and to then make a different selection which includes the saved value or values, in addition to other values. With reference to FIGS. 3A and 3B, in one preferred embodiment, this function is accomplished by displaying the value sets 100 in a plurality of locations 102. The value set symbols 106 are displayed in a plurality of configurations 104 identified as 104*a* through 104*j*, as shown in FIG. 3B. Each value set symbol includes a plurality of value symbols 106. The value symbols 106 are displayed on a plurality of predetermined locations 102, as shown in FIG. 3A. The locations 102 can be arranged in any predetermined manner, pattern or fashion, although preferably they are arranged in a grid, as shown in FIG. 3A. The value set symbols are preferably configured in various straight lines extending from one side of the grid to another side of the grid, as shown in FIG. 3B. Preferably, the configurations include the horizontal, vertical and diagonal lines displayed in FIG. 3B. It should be appreciated that this embodiment can include alternative configurations including, but not limited to, lines which are partially vertical, horizontal or diagonal, curved lines, partial or full circles, ovals or polygons or any other pattern which includes predetermined locations 102 for the value symbols 106.

Figure 4:
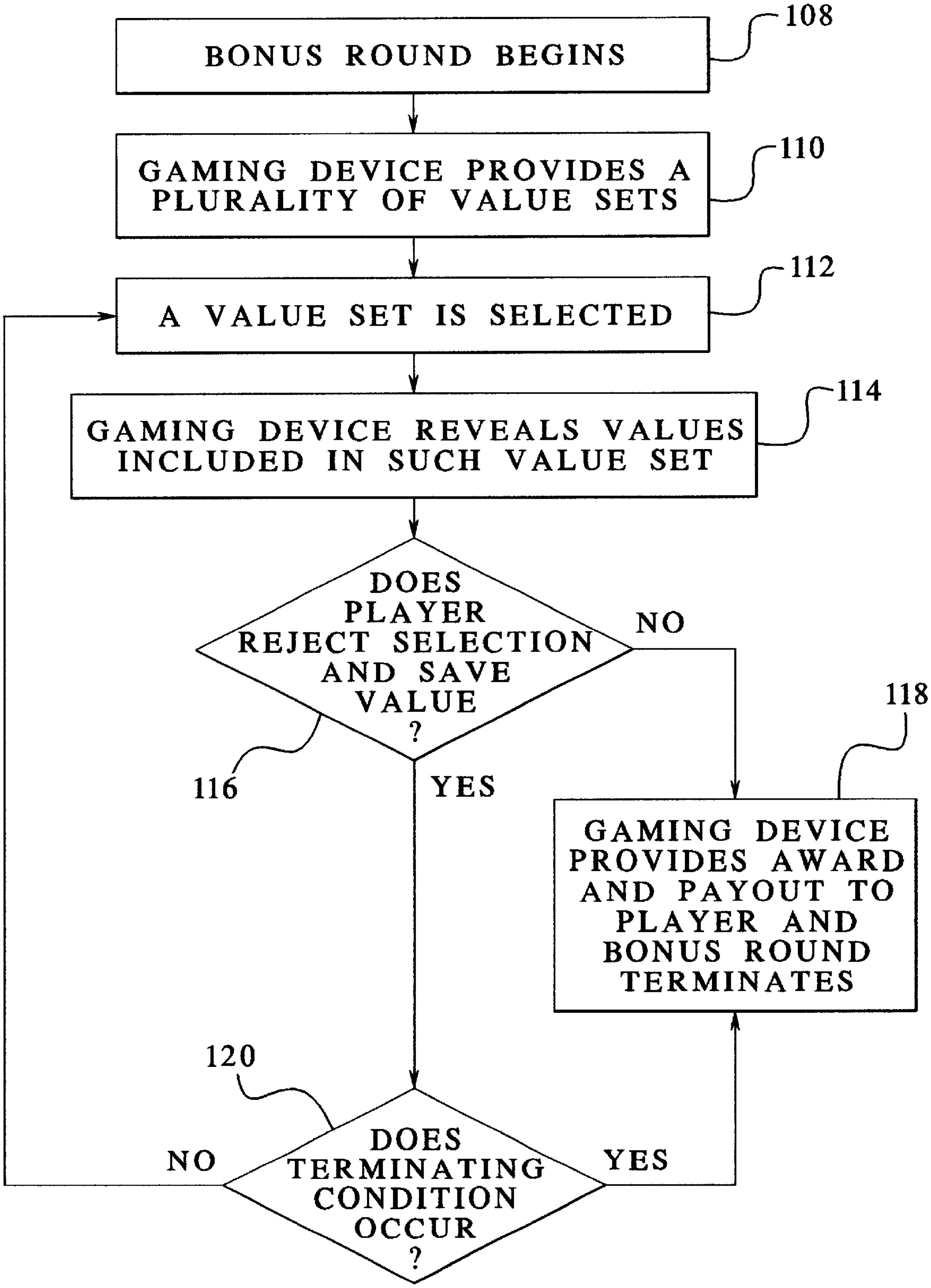
FIG. 4 is a flow diagram of one embodiment of the present invention.
Figure 5:
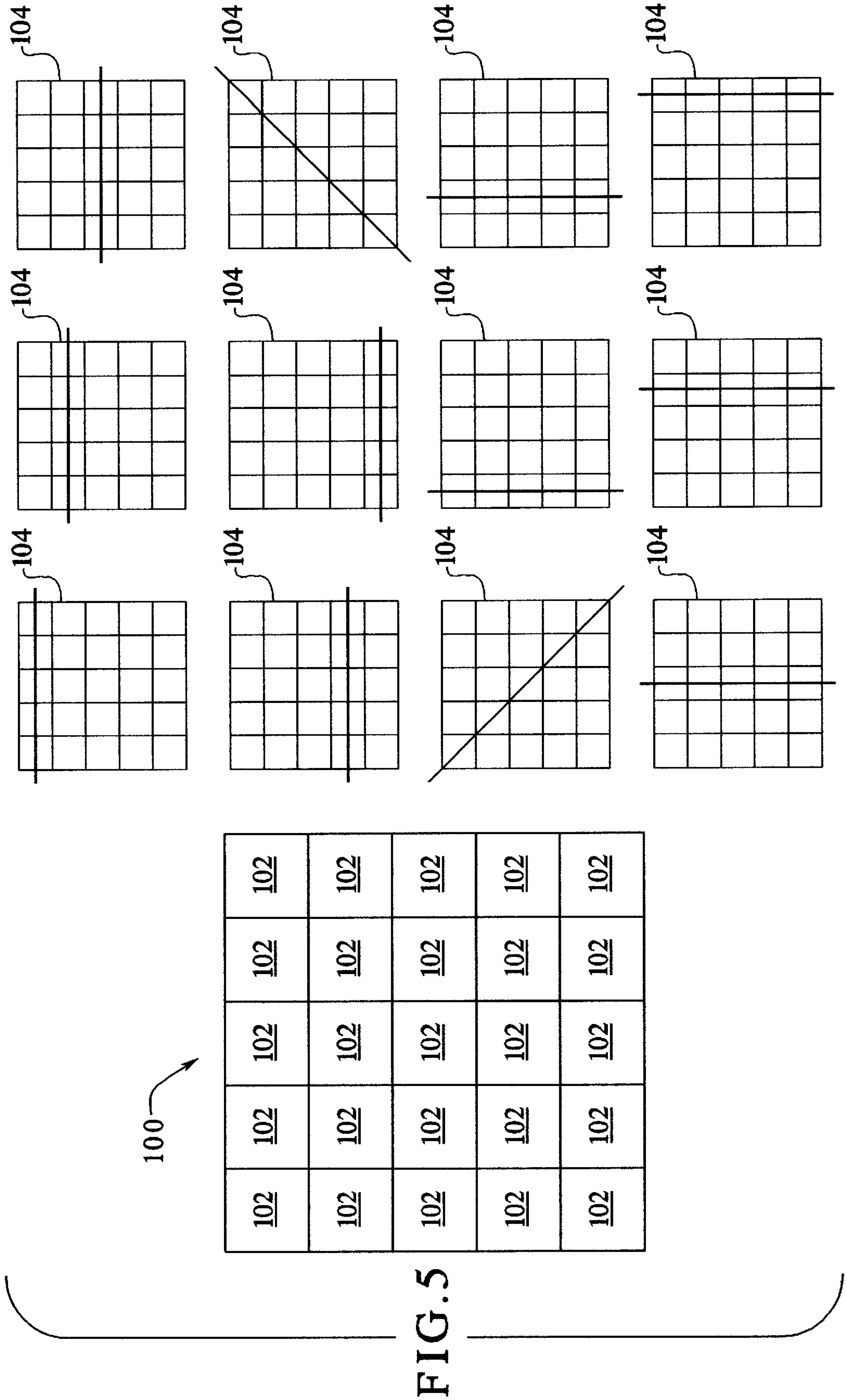
FIG. 5 is a top plan view of one embodiment of the present invention.

Each value set symbol 104 includes a plurality of value symbols 106 and each value symbol 106 is associated with a value. With reference to FIG. 4, the bonus round begins as indicated by block 108 and the gaming device 10 provides a plurality of value sets 100 as indicated by block 110. In this preferred embodiment, the gaming device 10 displays the value sets 100 to the player in the form of a grid as shown in FIGS. 3A through 3F. The gaming device informs the player of the various value set symbols 104 which the player can select. The gaming device can provide this information to the player in the manner shown in FIG. 3B or in any other manner such as that shown in FIG. 5. In FIG. 5, the gaming device displays the value sets 100 at a plurality of locations 102 on the grid. Adjacent to the grid, the gaming device displays a plurality of value set symbols 104, relatively small in size. These value set symbols 104 display various configurations which the player can select.

After the gaming device informs the player of the various value set symbols 104*a* through 104*j*, the player selects an initial value set 100 as indicated by block 112 in FIG. 4. The player makes a selection by choosing a value set symbol and activating an input device, such as a play button 20, thereby selecting the desired value set symbol. Next, the gaming device reveals the values associated with the chosen value set symbol, as indicated by block 114 in FIG. 4. In the example shown in FIGS. 3B through 3F, the gaming device provided the masked values for the value sets 100 as shown in FIG. 3C. The player selected value set symbol 104*f*, and the gaming device revealed the values twenty-five, seventy, fifty and sixty-five as shown in FIG. 3D.

At this point the player has the option of accepting or rejecting this first selection. If the player accepts the values associated with this first selection, the gaming device provides the player with an award equal to the sum of those values, as indicated by diamond 116 and block 118 in FIG. 4. If the player does not accept the values associated with this selection, the player can save at least one value as indicated by diamond 116. As discussed earlier, by saving a value the player can receive the saved value in the next value set 100 selected by the player. With reference to FIG. 3D, in this example, the player chose to save value seventy. In order to do so, the player's next selection, shown in FIG. 3E, must be a value set symbol which includes value seventy. Referring back to FIG. 4, after rejecting the selection and saving a value, a terminating condition may or may not occur, as indicated by diamond 120. A terminating condition preferably occurs when the player makes a predetermined number of selections, as discussed below. If a terminating condition does not occur, the player can make another selection. After making a subsequent selection the gaming device reveals the values associated with that selection. Again, the player can accept the values associated with the selection or save a value and proceed to make another selection. This process repeats itself until the player accepts an award or until a terminating condition occurs. In the example shown in FIGS. 3B through 3F, the player chose to make a second and third selection as shown in FIGS. 3E and 3F. Here, the player decided to save the value eighty revealed in FIG. 3E by selecting a different value set symbol which included the location 102 corresponding to the location of value eighty in value set symbol 104*b*. Eventually, a terminating condition will occur as indicated by diamond 120 in FIG. 4. A terminating condition can be any predetermined event or sequence of events which results in the termination of the bonus round. Preferably, the terminating condition is a predetermined number of selections made by the player. With reference to the example illustrated in FIGS. 3B through 3F, the player had two opportunities to accept a value sum corresponding to different value sets 100. Then the bonus round terminated, and the player received an award equal to the sum of the values revealed in FIG. 3F. Here, the player's strategy was to reject all selections and seek additional selections which included the highest value provided to the player in the prior selection. It should be appreciated that the player can save any value, not necessarily the highest one. It should also be appreciated that the player can reject a selection and not save a value.

In another embodiment shown in FIGS. 6A through 6D, the gaming device provides the player with value sets 100 in the form of value set symbols 104*k*, 104*l* and 104*m*. The gaming device enables the player to select one of these value set symbols 104*k* through 104*m*. In the example shown in FIG. 6B, the player selected value set symbol 104*k*, and the gaming device revealed values five, forty and thirty. At this point, the player can accept the sum of these values or save one of these values and make an additional selection.

Figure 6A:
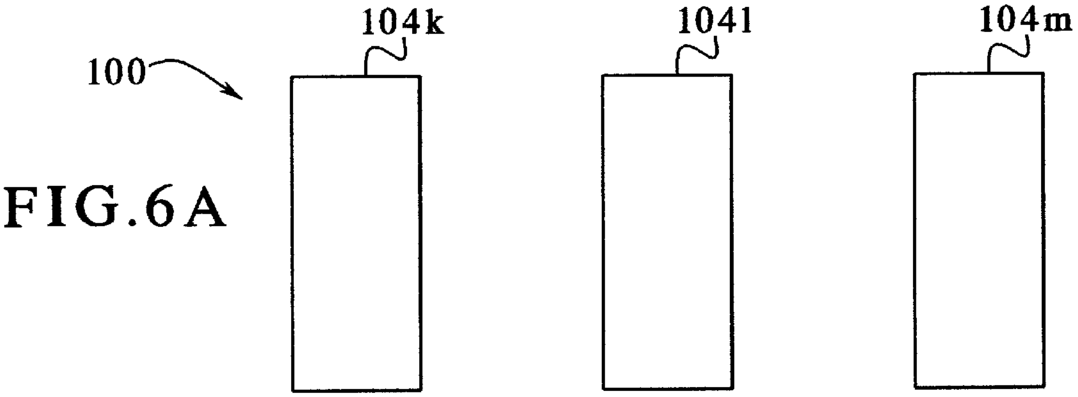
FIGS. 6A through 6D are top plan views of various stages of a bonus round in one embodiment of the present invention.
Figure 6B:
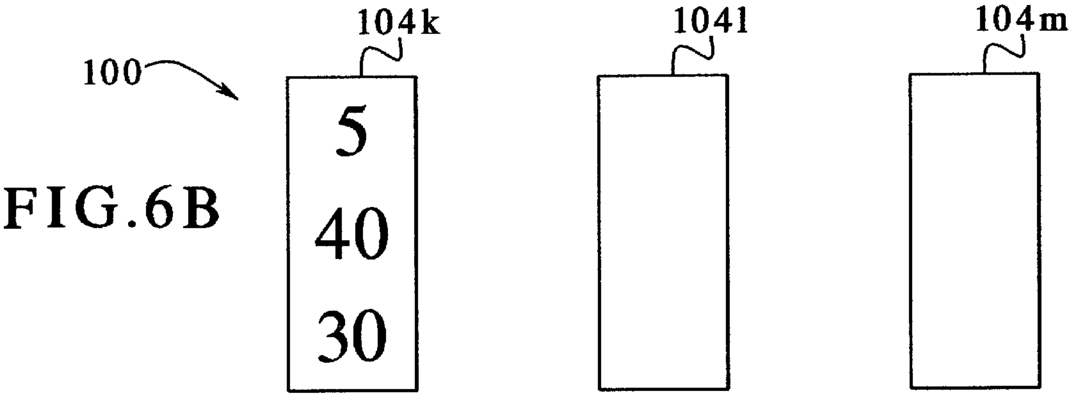
Figure 6C:
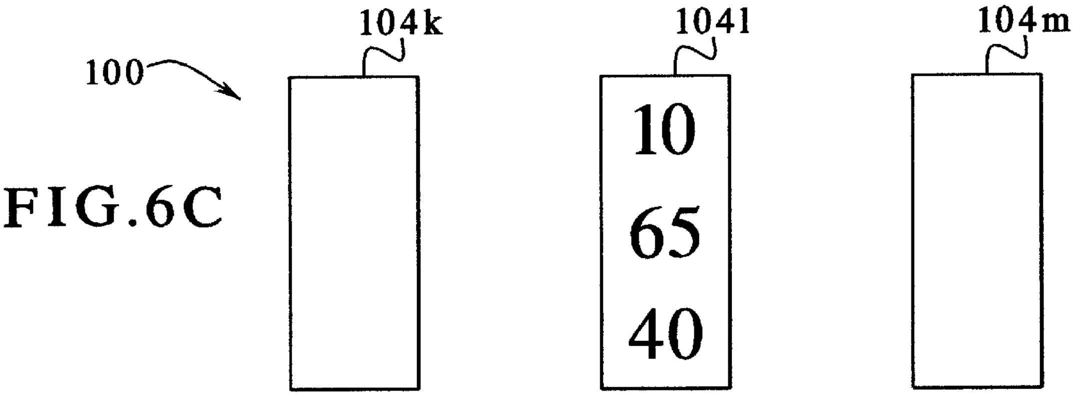
Figure 6D:
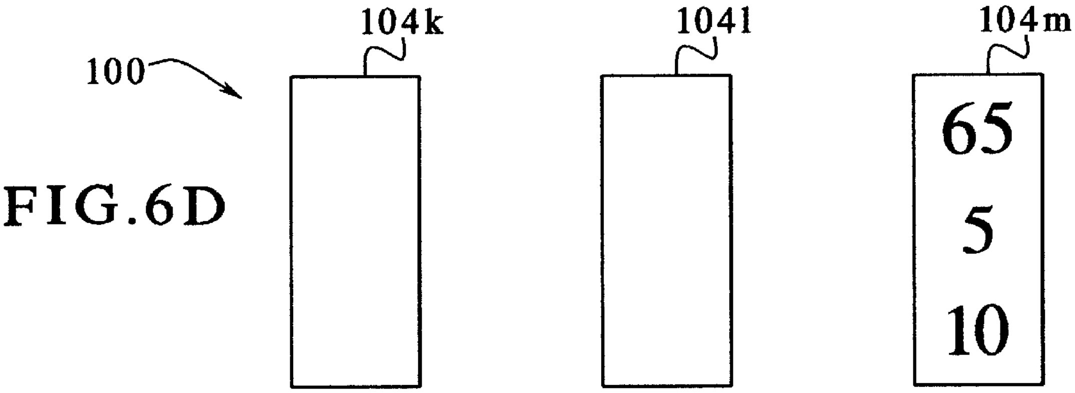

As shown in FIG. 6C, the player chose to save the highest value which was value forty. The gaming device then included this value forty in value sets 104*l* and 104*m*. When the player selected value set 104*l*, the gaming device revealed values ten, sixty-five and forty. Again, the player chose to save the highest value which was value sixty-five and, as shown in FIG. 6D, the player made a final selection of value set 104*m*. Here, the gaming device provided the player with values sixty-five, five and ten.

It should be appreciated that the present invention can be adapted to enable the player to make selections or to enable the gaming device to make selections of value sets for the player. The gaming device may do so based upon a determination made prior to the initiation of the bonus round or during the bonus round. Furthermore, the present invention can be adapted so that the player need not save a value prior to making an additional selection.

The bonus scheme of the present invention provides increased player involvement in accept and reject-type bonus schemes. The bonus scheme includes a plurality of value sets, preferably one of which a player may select. Each value set includes a plurality of values. When a player chooses a value set, a player can either accept the sum of the values associated with that value set, or the player can save preferably one of the values in that value set and choose a different value set which includes the saved value(s). This type of bonus scheme increases player involvement and the player's sense of control in determining the ultimate award provided to a player.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a game comprising:

a plurality of value sets, each value set including a plurality of values;

at least one award associated with each value set;

a display device which enables a player to view the value sets;

a value set selection input device; and a processor in communication with the display device and the value set selection input device, which enables the player to select one of the displayed value sets, causes the display device to display the values in the selected value set, and enables the player: (a) to obtain the award associated with said selected value set; or (b) to obtain the award associated with a different value set by selecting a different one of the displayed value sets which includes at least one of the displayed values of the selected value set.

2. The gaming device of claim 1, wherein the award associated with each of the value sets is based on at least one of the values included in said value set.

3. The gaming device of claim 1, wherein the award associated with each of the value sets is a sum of a plurality of the values included in said value set.

4. The gaming device of claim 1, wherein the award associated with each of the value sets is a sum of each of the values included in said value set.

5. The gaming device of claim 1, wherein the award associated with each of the value sets is a value included in said value set.

6. The gaming device of claim 1, wherein the award associated with each of the value sets is a value included in said value set, the value having a higher value than the other values in said value set.

7. A gaming device having a game comprising:

a plurality of sets, each set including a plurality of symbols;

at least one award associated with each of the sets;

a display device which enables a player to view the sets;

an input device; and a processor in communication with the display device and the input device, which enables the player to select one of the displayed sets, causes the display device to reveal the award associated with the selected set, and enables the player: (a) to obtain the award associated with said selected set; or (b) to obtain the award associated with a different set by selecting a different one of the displayed sets which includes at least one of the symbols of the selected set.

8. The gaming device of claim 7, wherein the award associated with each of the sets is based on at least one value associated with one of the symbols in said set.

9. The gaming device of claim 7, wherein the award associated with each of the sets is a sum of a plurality of values associated with the symbols in said set.

10. The gaming device of claim 7, wherein the award associated with each of the sets is a sum of each of a plurality of values associated with the symbols in said set.

11. The gaming device of claim 7, which includes a configuration associated with each of the sets.

12. The gaming device of claim 11, wherein each of the configurations has at least one displayed overlapping portion in common with one of the other configurations.

13. The gaming device of claim 12, which includes one symbol included in a plurality of the sets, said symbol associated with said overlapping portion.

14. The gaming device of claim 11, wherein each of the configurations has at least one intersecting portion in common with one of the other configurations.

15. The gaming device of claim 14, which includes one symbol included in a plurality of the sets, said symbol associated with said intersecting portion.

16. A gaming device having a game comprising:

a grid of masked values, the grid defining a plurality of value sets, each of the value sets including at least one masked value in common with another value set;

at least one award associated with each of the value sets;

a display device which enables a player to view the grid and value sets;

an input device; and a processor in communication with the display device and the input device, which enables the player to select one of the value sets defined by the grid, causes the display device to reveal the values in the selected value set, and enables the player: (a) to obtain the award associated with said selected value set; or (b) to obtain the award associated with a different value set by selecting a different one of the value sets which includes at least one of the revealed values of the selected value set.

17. The gaming device of claim 16, wherein the award associated with each of the value sets is based on at least one of the values included in said value set.

18. The gaming device of claim 16, wherein the award associated with each of the value sets is a sum of a plurality of the values included in said value set.

19. The gaming device of claim 16, wherein the award associated with each of the value sets is a sum of each of the values included in said value set.

20. The gaming device of claim 16, wherein the award associated with each of the value sets is a value included in said value set, the value having a higher value than all other values in said value set.

21. The gaming device of claim 16, wherein the grid defines each of the value set in a configuration.

22. The gaming device of claim 21, which includes overlapping configurations.

23. The gaming device of claim 21, which includes intersecting configurations.

24. The gaming device of claim 21, wherein the configurations are selected from the group consisting of lines, curves, partial circles, full circles, ovals and polygons.

25. The gaming device of claim 21, which includes a selectable symbol associated with each of the configurations.

26. A method of operating a gaming device, said method comprising the steps of:

(a) providing a plurality of masked values in a plurality of value sets;

(b) providing at least one award associated with each of the value sets;

(c) displaying the value sets to a player;

(d) enabling the player to select one of the value sets;

(e) revealing the masked values in the selected value set; and (f) enabling the player to obtain the award associated with said selected value set or to obtain the award associated with a different value set by selecting a different one of the value sets which includes at least one of the revealed values of the selected value set.

27. The method of claim 26, wherein the step of providing at least one award associated with each of the value sets includes the step of generating said award based on at least one of the values included in said value set.

28. The method of claim 26, wherein the step of providing at least one award associated with each of the value sets includes the step of summing a plurality of the values included in said value set.

29. The method of claim 26, wherein the step of providing at least one award associated with each of the value sets includes the step of summing each of the values included in said value set.

30. The method of claim 26, wherein the step of providing at least one award associated with each value set includes the step of providing the value having a higher value than all other values in said value set.

31. The method of claim 26, wherein the step of displaying the value sets to a player includes the step of displaying a grid of masked values defining said value sets.

32. The method of claim 26, wherein the step of displaying the value sets to a player includes the step of displaying each value set in a configuration selected from the group consisting of a line, curve, partial circle, full circle, oval and polygon.

33. The method of claim 32, which includes the step of providing at least one portion of each configuration which overlaps with a portion of another configuration.

34. The method of claim 33, which includes the step of providing one value included in a plurality of the value sets, said value associated with said portion.

35. The method of claim 32, which includes the step of providing at least one portion of each configuration which intersects with a portion of another configuration.

36. The method of claim 35, which includes the step of providing one value included in a plurality of the value sets, said value associated with said portion.

37. A method of operating a gaming device, said method comprising the steps of:

(a) providing a plurality of sets of symbols;

(b) providing at least one award associated with each of the sets;

(c) displaying the sets to a player;

(d) enabling the player to select one of the sets;

(e) revealing the award associated with the selected set;

(f) enabling the player to obtain the award associated with said selected set or obtain the award associated with a different set by selecting a different one of the displayed sets which includes at least one of the symbols of the selected set; and (g) repeating steps (d) through (f) at least once.

38. The method of claim 37, wherein the step of providing at least one award associated with each of the sets includes the step of generating said award based on at least one value included in said set.

39. The method of claim 37, wherein the step of providing at least one award associated with each of the sets includes the step of summing a plurality of values included in said set.

40. The method of claim 37, wherein the step of providing at least one award associated with each of the sets includes the step of summing each value included in said set.

41. The method of claim 37, wherein the step of providing at least one award associated with each set includes the step of providing a value having a higher value than all other values in said set.

42. The method of claim 37, wherein the step of displaying the sets to a player includes the step of displaying a grid of symbols defining said sets.

43. The method of claim 37, wherein the step of displaying the sets to a player includes the step of displaying each set in a configuration selected from the group consisting of a line, curve, partial circle, full circle, oval and polygon.

44. The method of claim 43, which includes the step of providing at least one portion of each configuration which overlaps with a portion of another configuration.

45. The method of claim 44, which includes the step of providing one award included in a plurality of the sets, said award associated with said portion.

46. The method of claim 44, which includes the step of providing at least one portion of each configuration which intersects with a portion of another configuration.

47. The method of claim 44, which includes the step of providing one award included in a plurality of the sets, said award associated with said portion.

* * * * *

UNITED STATES PATENT AND TRADEMARK OFFICE

CERTIFICATE OF CORRECTION

PATENT NO. : 6,464,582 B1
DATED : October 15, 2002
INVENTOR(S) : Baerlocher et al.

It is certified that error appears in the above-identified patent and that said Letters Patent is hereby corrected as shown below:

Column 4,
Line 13, change "sifting" to -- sitting --.
Line 17, change "sifting" to -- sitting --.

Signed and Sealed this

Eighth Day of April, 2003

JAMES E. ROGAN
*Director of the United States Patent and Trademark Office*